United States Patent [19]

Carr

[11] 4,100,332
[45] Jul. 11, 1978

[54] COMB TYPE BIPOLAR ELECTRODE ELEMENTS AND BATTERY STACKS THEREOF

[75] Inventor: Peter Carr, Utica, Mich.
[73] Assignee: Energy Development Associates, Madison Heights, Mich.
[21] Appl. No.: 770,725
[22] Filed: Feb. 22, 1977
[51] Int. Cl.² .................................. H01M 4/06
[52] U.S. Cl. .................................. 429/27
[58] Field of Search .................. 429/12, 13, 27, 28, 429/29, 40–44, 210, 199, 229

[56] References Cited
U.S. PATENT DOCUMENTS

| | | | |
|---|---|---|---|
| 552,220 | 12/1895 | Williams | 429/210 |
| 3,316,167 | 4/1967 | Clarke et al. | 429/210 |
| 3,575,720 | 4/1971 | Craig | 429/29 |
| 3,592,695 | 7/1971 | Moran | 429/27 |
| 3,855,002 | 12/1974 | Schroll | 429/41 |

Primary Examiner—John H. Mack
Assistant Examiner—H. A. Feeley
Attorney, Agent, or Firm—Bruce E. Hosmer; Thomas E. Harrison, Jr.

[57] ABSTRACT

A bipolar electrode element has an electrically conductive, chemically inert, generally flat wall having first and second opposing faces, each of the first and second faces having a plurality of spaced, parallel grooves therein with the spaced grooves in the first face being laterally staggered from the spaced grooves in the second face, first and second spaced and substantially parallel electrodes having first edges disposed within first and second respective grooves of said spaced parallel grooves in said first face and extending generally perpendicular from the plane of the inert wall; and a third electrode having a first edge disposed within a groove in said second face and extending generally perpendicular from the plane of the inert wall. A battery stack is obtained by positioning a plurality of the bipolar battery elements such that their electrodes are interdigitated.

18 Claims, 3 Drawing Figures

COMB TYPE BIPOLAR ELECTRODE ELEMENTS AND BATTERY STACKS THEREOF

BACKGROUND OF THE INVENTION

High energy density batteries are those that normally have available about 50 watt powers per pound. Recently a breakthrough has been uncovered for a new type of high energy density battery, described in U.S. Pat. No. 3,713,888 which is hereby incorporated by reference, and employs a metal halide electrolyte-halogen hydrate system. The use of such a system requires the handling of corrosive material such as chlorine, and aqueous solutions of chlorine as well as the metal halide electrolyte. Such a system is amenable to the use of bipolar electrodes such as those described in U.S. Pat. Nos. 3,813,301 and 3,909,298.

The bipolar electrodes of the aforementioned patents are those in which one face of two separate electrodes are joined together so as to form the desired bipolar electrode structure. A number of cells using the bipolar electrodes can be joined together in series to form cell banks and these can be further joined in series to increase the voltages developed, in parallel to increase the current capacity, or in mixed seriesparallel to accomplish both objectives. However, in such cell banks, the intercell distances are small, for example, four cells per 2.54 cm, which accentuates parasitic and/or dendritic effects.

It has been discovered that the problem associated heretofore with the small intercell distances can be greatly relieved by using a new bipolar electrode structure with electrical conduction across the width of the electrodes rather than through their thicknesses, a plurality of such electrode structures having their electrodes interdigitated so as to form the cell bank. It has been found that the use of this structure can increase the effective intercell distance from around 0.75 cm to about 6.35 cm or more while the actual distance between opposing electrode faces is about 0.2 cm.

Accordingly, it is the object of this invention to provide a new bipolar electrode element, and cell banks or electrode stack comprised of such elements in which the effective intercell distance is much greater than the actual interelectrode distance thereby deaccentuating the parasitic and/or dendritic effects associated with the electrochemical battery.

This and other objects of the present invention will become apparent to those skilled in this art from the following detailed description in which.

SUMMARY OF THE INVENTION

This invention relates to bipolar electrode elements and battery stacks comprising such elements. More particularly, the invention concerns a bipolar electrode element which has an electrically conductive, chemically inert, generally flat wall having first and second opposing faces, each of which faces have a plurality of spaced, generally parallel grooves therein and the spaced grooves in the first face are laterally staggered from the spaced grooves in the second face; first and second spaced and generally parallel electrodes having first edges disposed within first and second respective grooves of said spaced parallel grooves in said first face and extending generally perpendicular from the plane of said inert wall; and a third electrode having first edge disposed within a spaced groove in said second wall and extending generally perpendicular to the plane of said inert wall. The battery stack contains a plurality of the bipolar electrode elements whose electrodes have been interdigitated.

DECRIPTION OF THE PREFERRED EMBODIMENT

For convenience, the present invention will be described with reference to the zinc/chlorine/zinc chloride electrolyte system described in detail in the aforementioned U.S. Pat. No. 3,713,888, although the present invention is not limited to such a system.

Figure 1:
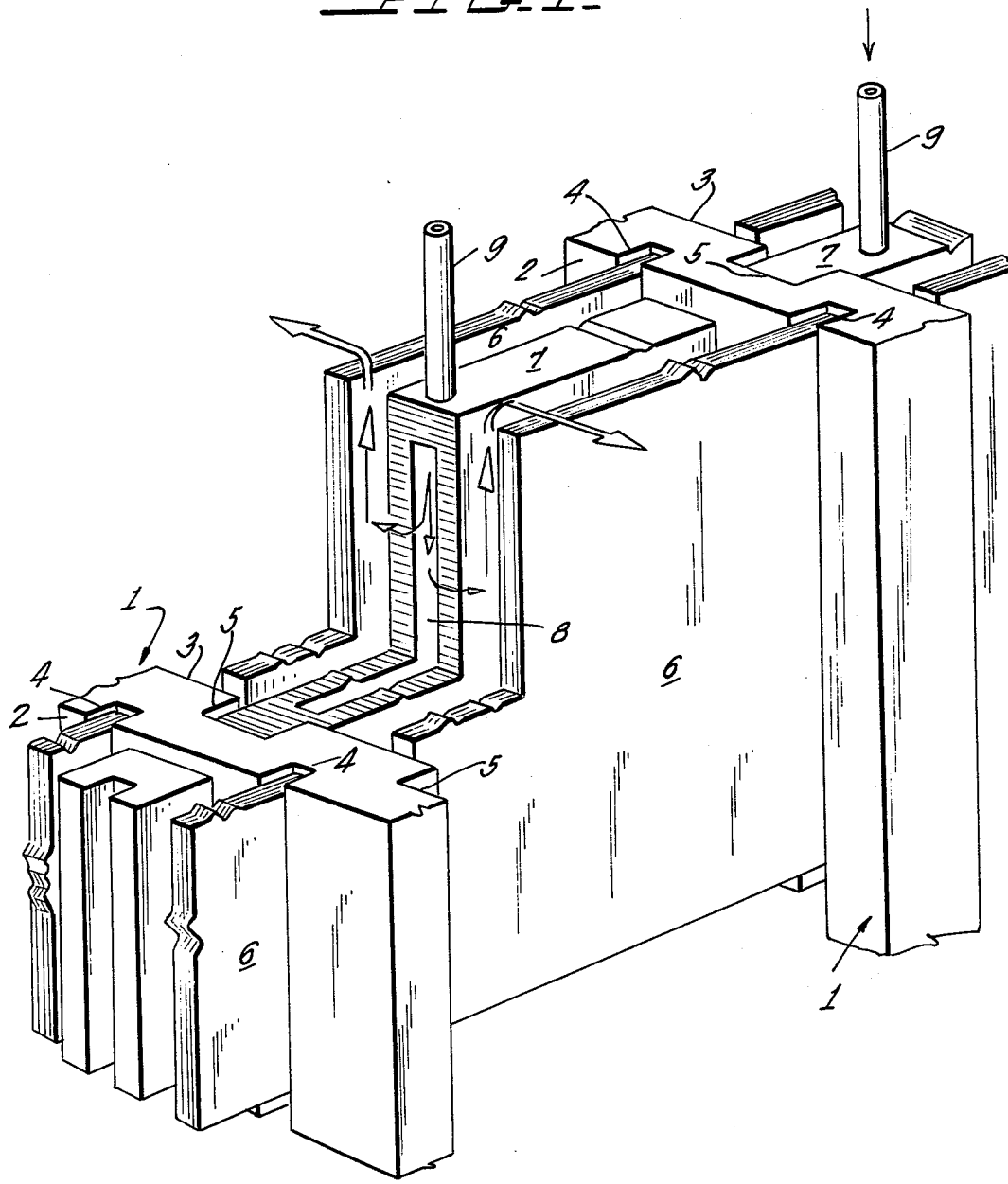
FIG. 1 is a perspective view, partially cut away, of two comb-type or interdigitated bipolar electrode elements of the instant invention.

FIG. 1 shows two of the bipolar electrode elements of the present invention whose electrodes have been interdigitated. Each element has an electrically conductive, chemically inert, generally flat wall 1 which has a first and second opposing faces 2, 3. The plane of first face 2 is usually parallel to second face 3. Face 2 contains a series of spaced grooves 4 which are generally parallel to each other and preferably symmetrically disposed along face 2. Similarly, face 3 contains a series of spaced grooves 5 which are generally parallel to each other and preferably are symmetrically disposed along face 3. Grooves 4 in face 2 are laterally staggered from grooves 5 in face 3. Preferably, each groove 5 is midway between a pair of adjacent grooves 4 and vice versa.

Wall 1 can be constructed of any suitable electrically conductive material which is chemically resistant, i.e., chemically inert, to the electrolyte and other chemical entities with which it will come into contact. Thus, wall 1 can be manufactured from graphite, a valve metal such as titanium, and the like materials. Wall 1 is preferably electrolyte and gas impervious.

The bipolar electrode element contains at least two electrodes 6 which are constructed from a suitable electrode material such as fine graphite. In the zinc/chlorine/zinc chloride system, electrodes 6 are the zinc electrodes. Electrodes 6 are generally rectangular. One edge of electrode 6 is disposed within an associated groove 4 in face 2 of wall 1 so that electrode 6 is in electrical contact with wall 1.

At least one electrode 7, which is generally rectangular, is provided and one edge of electrode 7 is disposed within an associated groove 5 in face 3 of wall 1. In the metal halidehalogen hydrate battery system, electrode 7 is preferably porous and constitutes the chlorine electrode. Electrode 7 can be constructed of any suitable electrode material such as porous graphite, exemplified by UCC PG-60 and Airco Speer 37-G, or porous noble metal catalyzed valve metals as exemplified by ruthenized titanium.

The edges of electrodes 6 within the associated grooves 4 and the edges of electrodes 7 within the associated grooves 5 are maintained within the grooves by any suitable means. For example, the edges can be held in their associated grooves by cementing, plasma spraying at the point of contact, or welding. It is preferred, however, that the electrodes be fabricated such that they are slightly thicker than their associated groove so that when the edges are pressed into the groove, they are held in place as a result of the pressure fit. Pressure fitting the electrodes into their associated grooves is a simple and reliable technique and results in a low contact resistance.

In the preferred embodiment shown in FIG. 1, the chlorine electrode 7 has been fabricated so as to have an internal cavity 8. This construction can be accomplished by a variety of methods apparent to those skilled in the art such as, for example, by fabricating two appropriately shaped electrode halves which are then sealed around the edges either with a nonconducting stable mask or by shaping and bonding the electrode halves themselves. Cavity 8 is the space into which electrolyte is fed. Electrodes 7 are also provided with gas venting holes (not shown).

In order to achieve uniform electrolyte distribution to the individual chlorine electrodes 7, each chlorine electrode is supplied with electrolyte through a small diameter conduit 9 which is connected to a manifold system and acts as a flow control orifice. It is preferred that conduits 9 carry electrolyte from a top manifold 10 down to the bottom of the chlorine electrode cavity 8 because the bottom of the cell is a preferred feed point. This arrangement also minimizes inlet parasitic currents by maximizing conduit length for maximum inlet electrolyte resistance between individual cells. Electrolyte is fed to manifold 10 from a reservoir 11.

Figure 2:
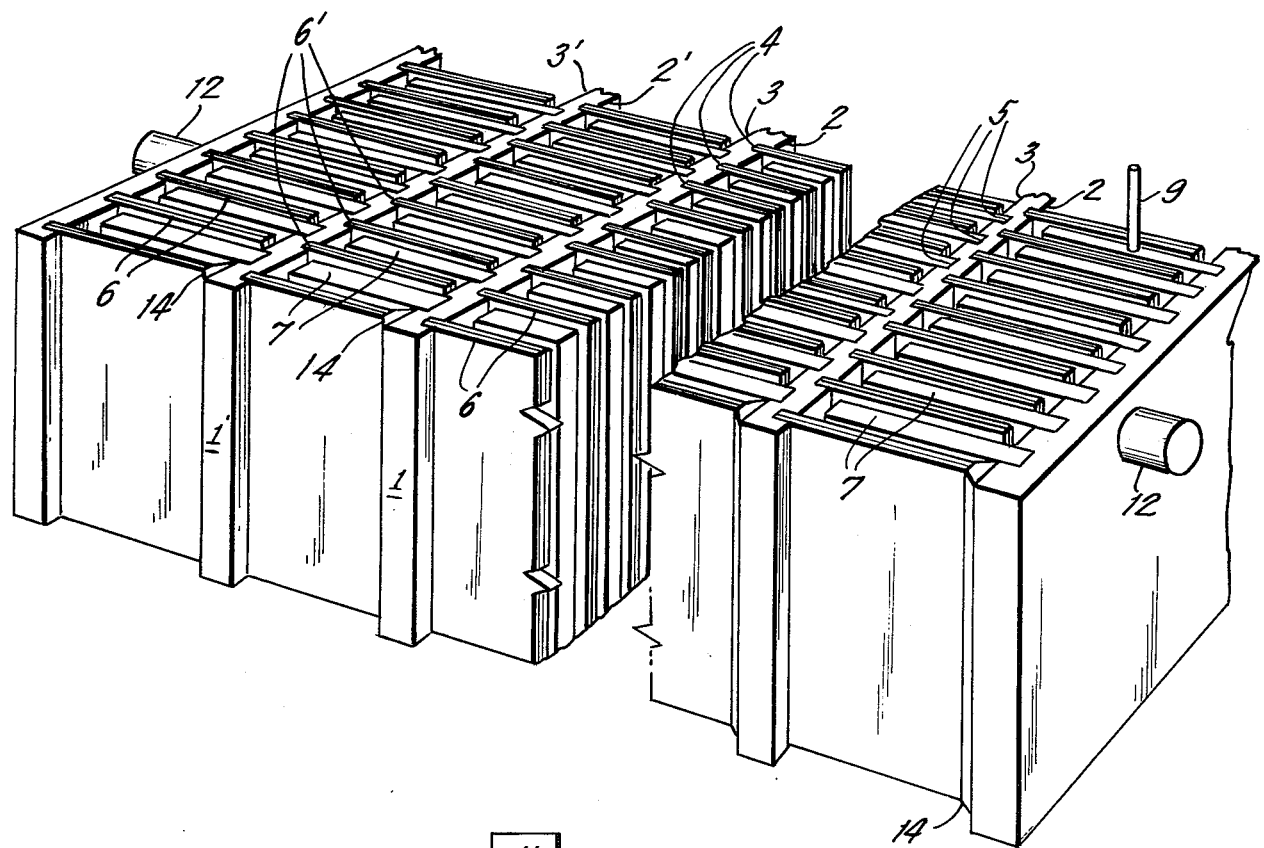
FIG. 2 is a perspective view of a plurality of interdigitated electrode elements which form the battery stack of the instant invention.

A group of the bipolar electrode elements are combined so as to form a group of cell banks, i.e., battery stack, as shown in FIG. 2. The inert wall 1 of each bipolar element is positioned substantially parallel to wall 1' of the adjacent bipolar elements. Except for the last electrode in each cell, each chlorine electrode 7, which extends from face 3 generally perpendicular from the plane of inert wall 1, is positioned between a pair of adjacent zinc electrodes 6' which extend generally perpendicular from the plane of adjacent inert wall 1' from face 2' thereof, and vice versa. In other words, chlorine electrodes 7 of one bipolar electrode element are interdigitated with the zinc electrodes of the adjacent bipolar element. Each electrode extends almost to the inert wall of the adjacent bipolar electrode element such that there is a small gap between the end of the electrode and the inner wall 1 of the adjacent bipolar element.

The number of bipolar electrode elements which are interdigitated to form the battery stack can be varied as desired. The endmost bipolar elements carry only zinc electrodes 6 extending from notches 4 in face 2 or only chlorine electrodes 7 extending from notches 5 in face 3. The outermost face of the end inert walls, i.e., the face which does not carry electrodes, can be notched if desired but are preferably generally flat and the battery terminals 12 are conveniently situated on such faces.

The electrodes between each pair of adjacent inert walls 1 constitute a cell and it will be recognized that the cell area can be increased simply by lengthening the inert wall 1 and attaching more electrodes. It is preferred that the electrodes at the extreme ends of each cell be either all zinc electrodes 6 or all chlorine electrodes 7. This arrangement limits the possibility of external shorting because it insures that the voltage difference existing every cell width will be one half the voltage difference if the outermost electrodes alternated from zinc electrode 6 to chlorine electrode 7 along the battery stack.

Figure 3:
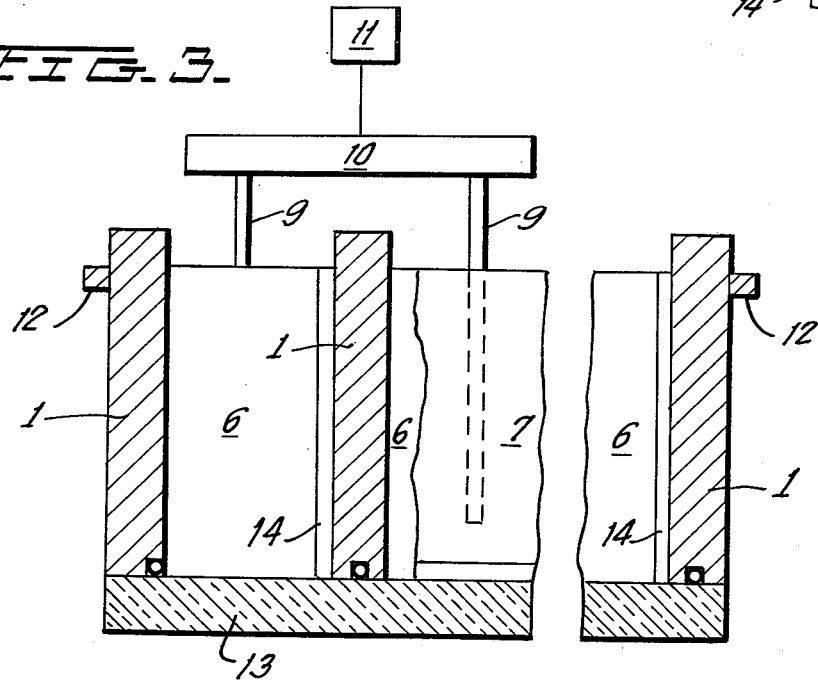
FIG. 3 is a cross-section, partly cut away, of a typical battery stack of the instant invention.

As shown in FIG. 3, the individual bipolar electrode elements are seated on a suitable nonconducting, stable cell bottom 13. The inert walls 1 are sealed to bottom 13 by any suitable means such as by clamping using titanium through bolts onto a glass plate. To insure a good seal, porous teflon gasketing material can be interposed between the glass and the bipolar element. In this configuration, the battery stack walls are composed of the endmost inert walls, i.e., the inner walls which have electrodes on only one side, and the outermost electrodes in each individual cell; since there is a small gap between the end of each electrode and its adjacent inert wall, a suitable inert gasket 14 is provided in order to fill the gap associated with the outermost electrode. There is no top so that each electrode in the stack is essentially open to sump gas space which provides the best gas release possible from the cell itself. If the stack is enlcosed within a casing, suitable top gas space should be provided. Alternative to clamping the individual bipolar elements on to a base plate, the individual elements can be fitted into a vacuum formed, open topped box and a seal made between the bottom and both sides to the grooved inert walls 1.

In long terms cell operations, it is necessary to provide a debris collection space. As illustrated in FIG. 1, this can be accomplished by arranging the electrodes such that there is a small space between the bottom of the electrodes and the bottom of inert wall 1. However, in order to retain electrolyte in the cell, the outermost electrodes must, of necessity, extend all the way to the bottom and be sealed to the non-conductive support base using, for example, a porous teflon bottom gasket.

In operation, electrolyte flows out of the interelectrode space over the complete width of the electrode. As a result, there is an excellent gas release from the interelectrode gap and a minimum of turbulence of the electrolyte. In cells without separators, turbulence within the interelectrode space significantly increases coulombic inefficiencies.

In each of the cells of the battery stack, all of the electrolyte streams flowing out of the interelectrode space combine and flow over the end electrode, or the cell container wall if one is provided, into a common sump (not shown). One method of separating the electrolyte between cells is shown in FIG. 1 where the inert walls 1, which function as cell dividers, were fabricated somewhat higher than the top of the electrode in the cell. Electrical isolation between cells is insured by the high resistance of the film of electrolyte flowing over the end electrode or inner wall, or, stated in another way, outlet isolation is provided by having a "water fall" on each cell.

A typical battery stack constructed in accordance with FIGS. 2 and 3 can contain 10–12 comb type bipolar elements. Each element can have an inert wall 1 about 10 cm high and about 12 cm long; each first face 2 can have 14 zinc electrodes 6 extending about 8 cm from the plane of face 2 and whose top is about 2.54 cm below the top of inert wall 1; and each second face 3 can have 12 chlorine electrodes 7 extending about 8 cm from the plane of face 3, the top of each being about 2.54 cm below the top of inert wall 1 and the bottom of each being about 0.3 cm above the bottom of inert wall 1. The bottom of each zinc electrode 6, except for the outermost electrodes 6, can be about 0.3 cm above the bottom of inert wall 1.

It will be appreciated by those skilled in the art that various changes and modifications can be made in the comb type both bipolar electrode elements and battery stacks described in this specification without departing from the spirit and scope of the invention. The various embodiments which have been set forth were for the purpose of illustration only and were not intended to limit the invention.

I claim:

1. An improved bipolar electrode for increasing the effective intercell distance as opposed to the actual distance between opposing electrode faces wherein the improvement comprises a comb type element comprising an electrically conductive, chemically inert, generally flat wall having first and second opposing faces, each of said first and second faces having a plurality of spaced, substantially parallel grooves therein, said spaced grooves in said first face being laterally staggered from said spaced grooves in said second face; first and second spaced and generally parallel electrodes having first edges disposed within first and second respective grooves of said spaced parallel grooves in said first face and extending generally perpendicular from the plane of said inert wall; and a third electrode having a first edge disposed within one of the spaced grooves in said second face and extending generally perpendicular from the plane of said inert wall.

2. The comb type bipolar element of claim 1 wherein said spaced grooves in said first and second faces are symmetrically disposed.

3. The comb type bipolar element of claim 2 wherein said third electrode is a porous electrode.

4. The comb type bipolar element of claim 3 wherein said porous electrode has a substantially sealed internal cavity adapted to receive electrolyte from without said electrode which electrolyte passes through said porous electrode.

5. The comb type bipolar element of claim 4 wherein an electrolyte supply conduit communicates from without said porous electrode to the bottom of said interior cavity.

6. The comb type bipolar element of claim 3 comprising a plurality of said porous electrodes, each of said porous electrodes having a first edge disposed within an associated groove of said spaced grooves in said second face and extending generally perpendicular from the plane of said inert wall.

7. The comb type bipolar element of claim 6 having a plurality of said first electrodes, each of said first electrode having a first edge disposed within an associated groove of said spaced grooves in said first face and extending generally perpendicular from the plane of said inert wall.

8. An improved secondary battery wherein the improvement comprises a comb type bipolar battery element stack comprising a non-conductive support base having a plurality of comb type bipolar electrode elements thereon; each of said bipolar electrode elements comprising an electrically conductive, chemically inert, generally flat wall having first and second opposing faces, each of said first and second faces having a plurality of spaced, generally parallel grooves therein, said spaced grooves in said first face being laterally staggered from said spaced grooves in said second face, first and second spaced and generally parallel electrodes having first edges disposed within the first and second respective grooves of said spaced grooves in said first face and extending generally perpendicular from the plane of said inert wall, and a third electrode having a first edge disposed within a spaced groove in said second face and extending generally perpendicular from the plane of said inert wall; said first and second electrodes of one bipolar electrode element being interdigited with said third electrode of the adjacent comb type bipolar electrode element.

9. The battery stack of claim 8 wherein each of said elements has a plurality of said first electrodes, each of said first electrodes having a first edge disposed within an associated groove in said first face and extending generally perpendicular to the plane of said inert wall, and wherein each of said elements has a plurality of said third electrode, each of said third electrodes having a first edge disposed within an associated groove in said second face and extending generally perpendicular to the plane of said inert wall; a plurality of said first, second and third electrodes being interdigited.

10. The battery stack of claim 9 wherein said spaced grooves in said first and second faces are symmetrically disposed and wherein each of said third electrodes are porous.

11. The battery stack of claim 10 wherein each of said porous third electrodes have an internal cavity adapted to receive electrolyte and an electrolyte supply conduit interconnecting said cavity with an external electrolyte supply.

12. The battery stack of claim 11 wherein the top of said inert wall of each of said elements extends above the top of said firt, second and third electrodes associated therewith.

13. The battery stack of claim 12 wherein the bottom of said inert wall of each of said elements extends below the bottom of at least one of said first, second and third electrodes associated therewith.

14. The battery stack of claim 13 wherein the outermost electrodes associated with each of said plurality of elements are identical.

15. The battery stack of claim 14 further comprising an electrolyte reservoir, and a top manifold interconnected to said reservoir and to each of said electrolyte supply conduits.

16. The battery stack of claim 15 wherein each of said first edges are pressure fit into their respective grooves.

17. The battery stack of claim 16 wherein said plurality of elements is contained within an open-topped casing.

18. The battery stack of claim 17 wherein the ends of said flat walls are in contact with their respective opposing side walls of said casing.

* * * * *